United States Patent
Omran et al.

(10) Patent No.: US 10,449,944 B2
(45) Date of Patent: Oct. 22, 2019

(54) SYSTEM AND METHOD FOR CONTROLLING PTO CLUTCH ENGAGEMENT USING ADAPTIVE INCREMENTAL PID CONTROL

(71) Applicant: CNH Industrial America, LLC, New Holland, PA (US)

(72) Inventors: Ashraf Omran, Chicago, IL (US); Brian A. Hartman, Valparaiso, IN (US)

(73) Assignee: CNH Industrial America LLC, New Holland, PA (US)

( * ) Notice: Subject to any disclaimer, the term of this patent is extended or adjusted under 35 U.S.C. 154(b) by 121 days.

(21) Appl. No.: 15/800,319

(22) Filed: Nov. 1, 2017

(65) Prior Publication Data
US 2019/0126901 A1    May 2, 2019

(51) Int. Cl.
*B60W 10/02* (2006.01)
*B60W 10/06* (2006.01)
(Continued)

(52) U.S. Cl.
CPC ............ *B60W 10/02* (2013.01); *B60K 25/02* (2013.01); *B60W 10/06* (2013.01); *F16D 48/06* (2013.01);
(Continued)

(58) Field of Classification Search
CPC ............... B60W 10/02; B60W 10/06; B60W 2300/152; B60W 2510/02; B60W 2510/06; B60W 2710/0644; B60K 25/02; B60K 2025/022; F16D 48/06; F16D 2500/10437; F16D 2500/1045; F16D 2500/106; F16D 2500/30426; F16D 2500/3065

See application file for complete search history.

(56) References Cited

U.S. PATENT DOCUMENTS 5,971,888 A   10/1999 Goode
6,267,189 B1   7/2001 Nielsen et al.
(Continued)

FOREIGN PATENT DOCUMENTS

WO   WO 2016182566   11/2016

OTHER PUBLICATIONS

Cummins "Driver Technique" http://cumminsengines.com Dated Jan. 3, 2017 (2 pages).

*Primary Examiner* — Tinh T Dang
(74) *Attorney, Agent, or Firm* — Rickard K. DeMille; Rebecca L. Henkel

(57) ABSTRACT

A method for controlling engagement of a power take-off (PTO) clutch may include transmitting a PTO control command for initiating engagement of the PTO clutch, determining that an output speed for the PTO clutch has not increased within a predetermined time period following the transmission of the PTO control command, and determining an average engine pre-load for the work vehicle over a time period occurring prior to transmission of the PTO control command. Moreover, in response to determining that the output speed for the PTO clutch has not increased within the predetermined time period, the method may include transmitting a speed control command associated with increasing a requested engine speed for the work vehicle, determining an adaptive torque command for controlling the engagement of the PTO clutch as a function of the average engine-preload, and controlling the engagement of the PTO clutch based on the adaptive torque command.

20 Claims, 6 Drawing Sheets

(51) Int. Cl.
  *B60K 25/02*    (2006.01)
  *F16D 48/06*    (2006.01)

(52) U.S. Cl.
  CPC .. *B60K 2025/022* (2013.01); *B60W 2300/152* (2013.01); *B60W 2510/02* (2013.01); *B60W 2510/06* (2013.01); *B60W 2710/0644* (2013.01); *F16D 2500/106* (2013.01); *F16D 2500/1045* (2013.01); *F16D 2500/10437* (2013.01); *F16D 2500/3065* (2013.01); *F16D 2500/30426* (2013.01)

(56) References Cited

U.S. PATENT DOCUMENTS

| | | |
|---|---|---|
| 6,564,915 B2 | 5/2003 | Lorentz et al. |
| 6,616,559 B1 * | 9/2003 | Hori ............... B62D 11/18 475/218 |
| 6,928,358 B2 | 8/2005 | Brooks et al. |
| 7,048,106 B2 | 5/2006 | Hou |
| 7,234,367 B2 | 6/2007 | Hou et al. |
| 7,252,623 B2 | 8/2007 | Meyer et al. |
| 7,357,753 B2 | 4/2008 | Steen et al. |
| 7,377,103 B2 | 5/2008 | Yu et al. |
| 7,669,393 B2 * | 3/2010 | Park ............... A01D 34/828 192/18 A |
| 7,727,114 B2 | 6/2010 | Tarasinski et al. |
| 8,056,695 B2 | 11/2011 | Silbernagel |
| 8,092,342 B2 | 1/2012 | Eriksson et al. |
| 8,200,387 B2 | 6/2012 | Maier et al. |
| 8,321,085 B2 * | 11/2012 | Saito ............... B60W 10/026 172/4.5 |
| 9,079,493 B2 | 7/2015 | Pociask et al. |
| 9,086,699 B2 | 7/2015 | Pirotais |
| 9,398,741 B2 | 7/2016 | Dwyer et al. |
| 2015/0057901 A1 | 2/2015 | Sundholm et al. |
| 2017/0198769 A1 * | 7/2017 | Vora ............... B60W 30/1882 |

* cited by examiner

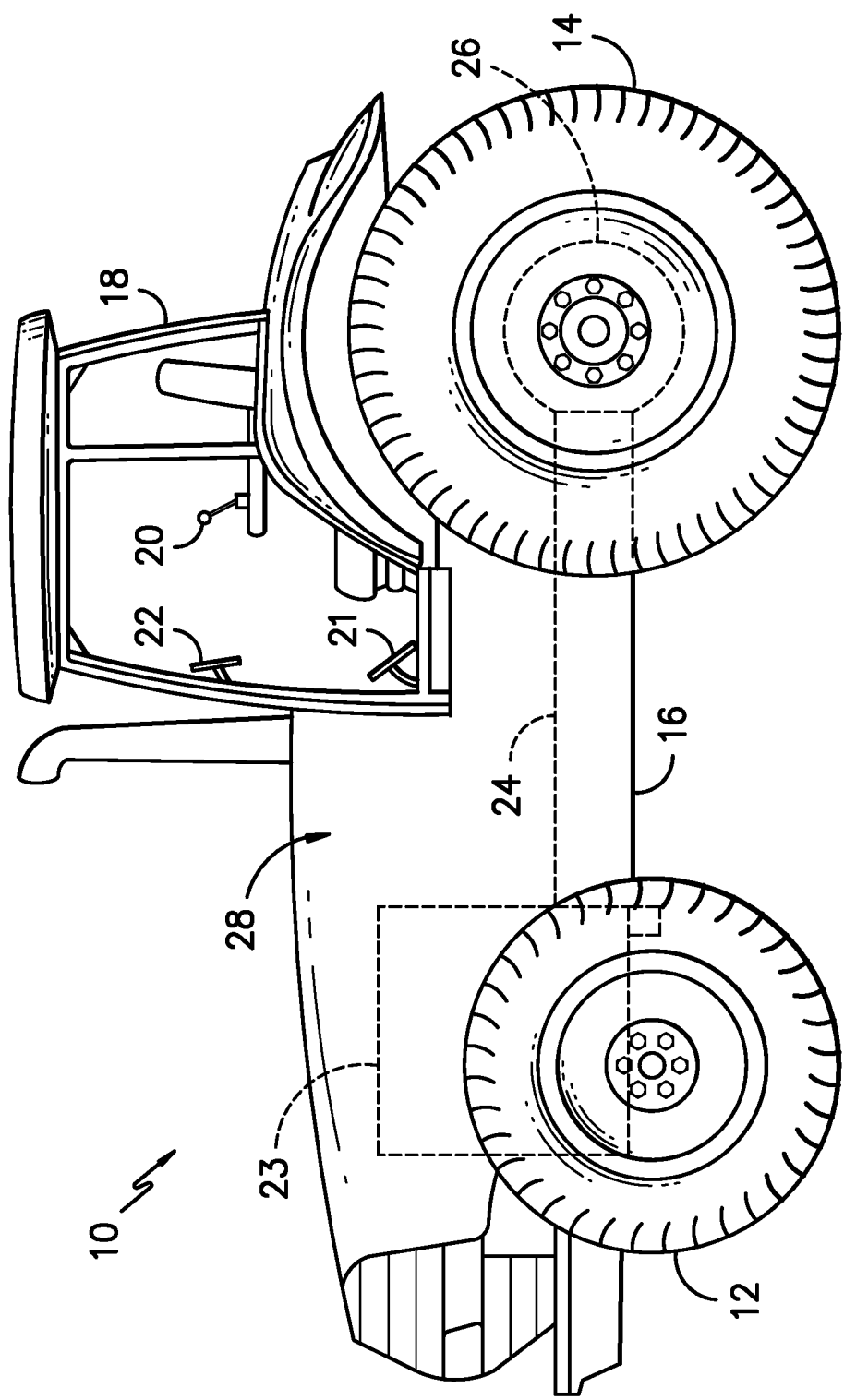
FIG. -1-

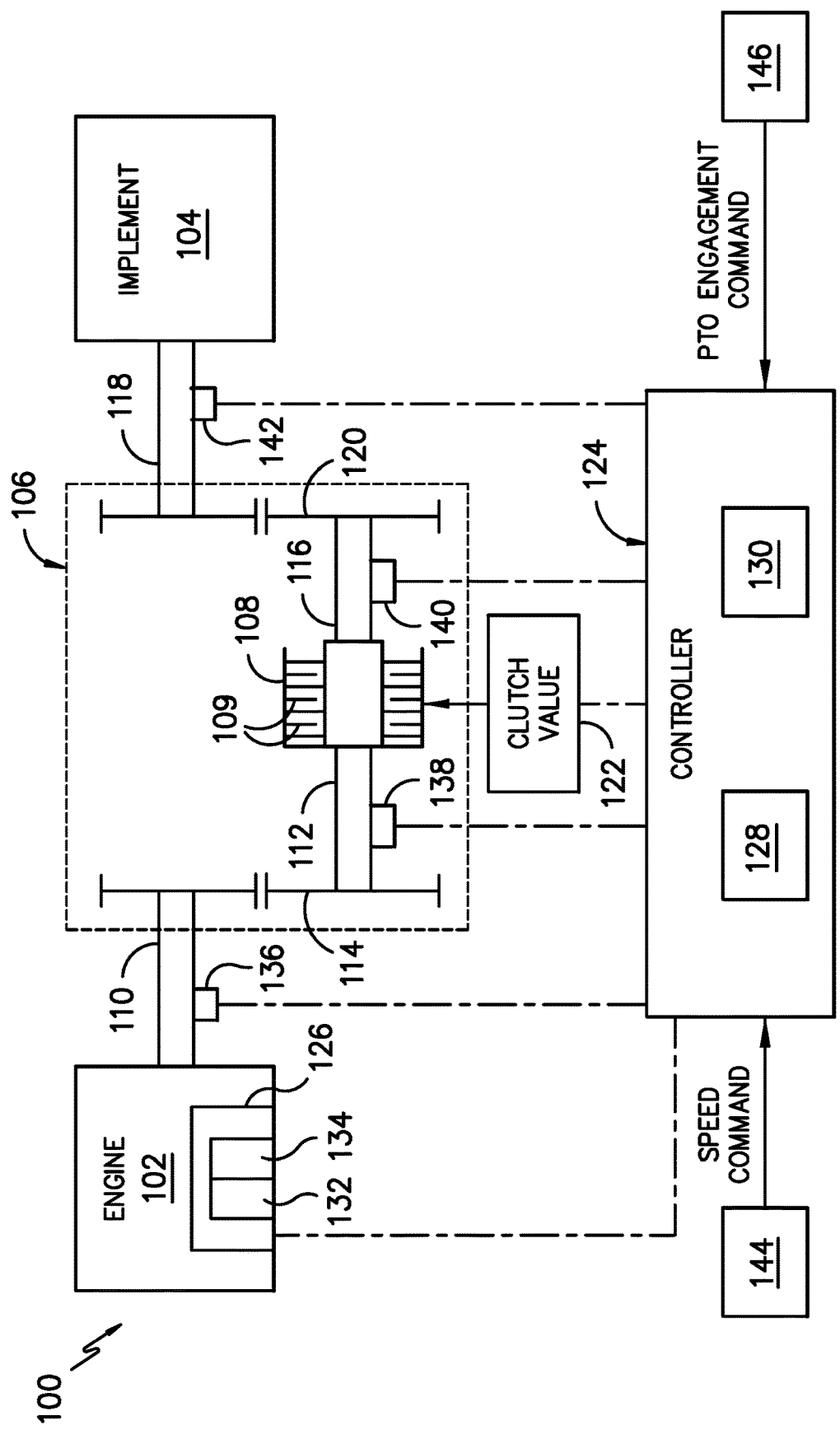
FIG. -2-

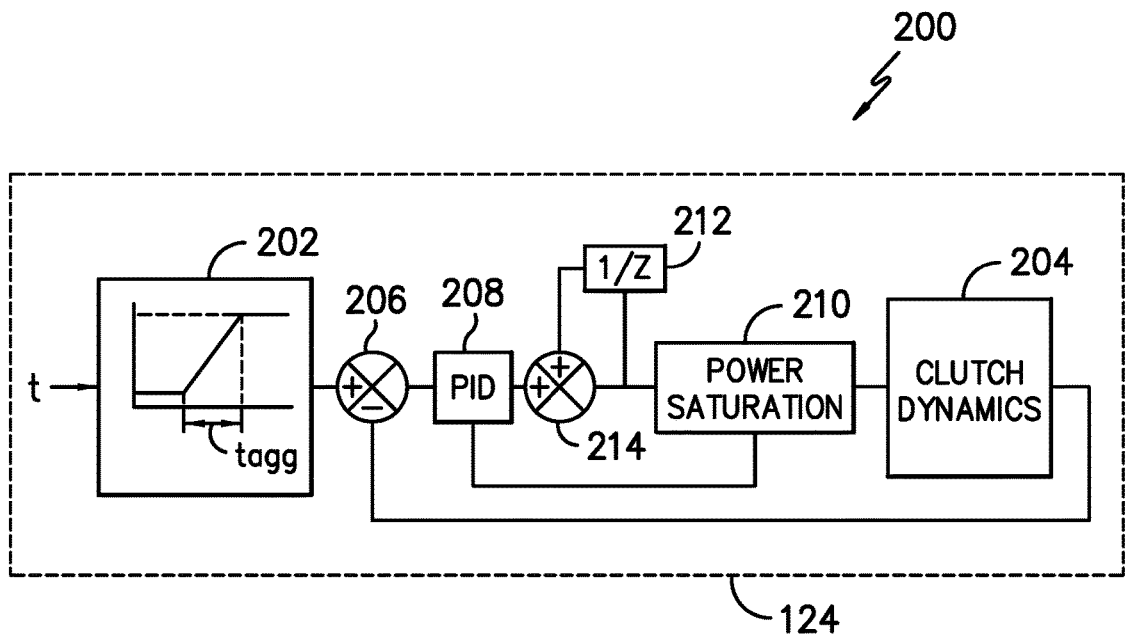
*FIG. -3-*
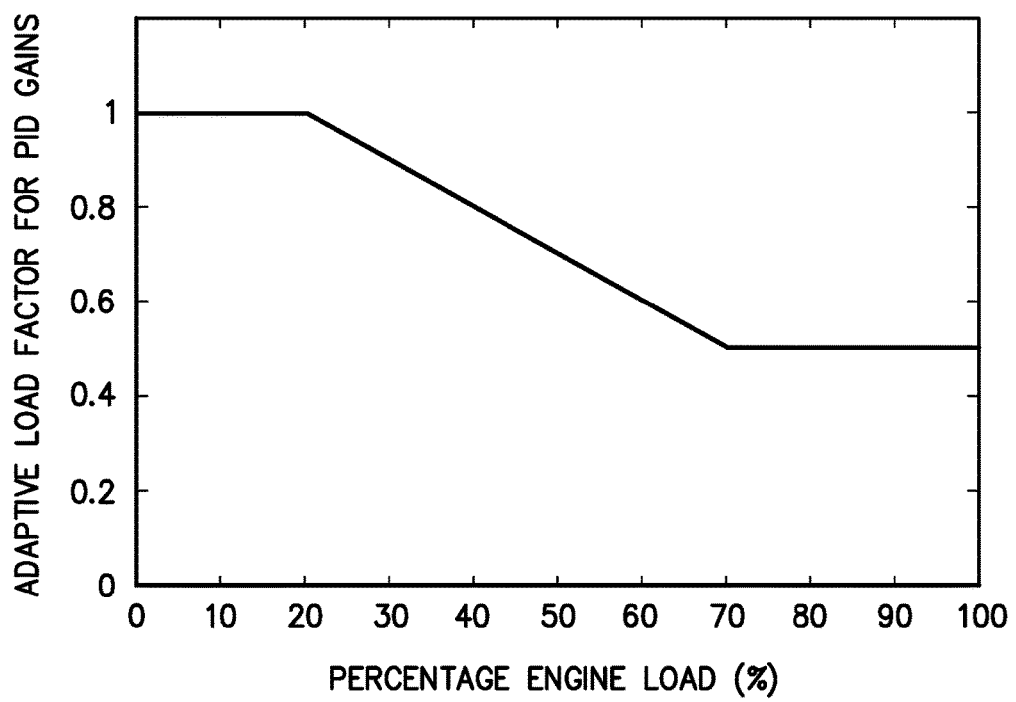
*FIG. -4-*

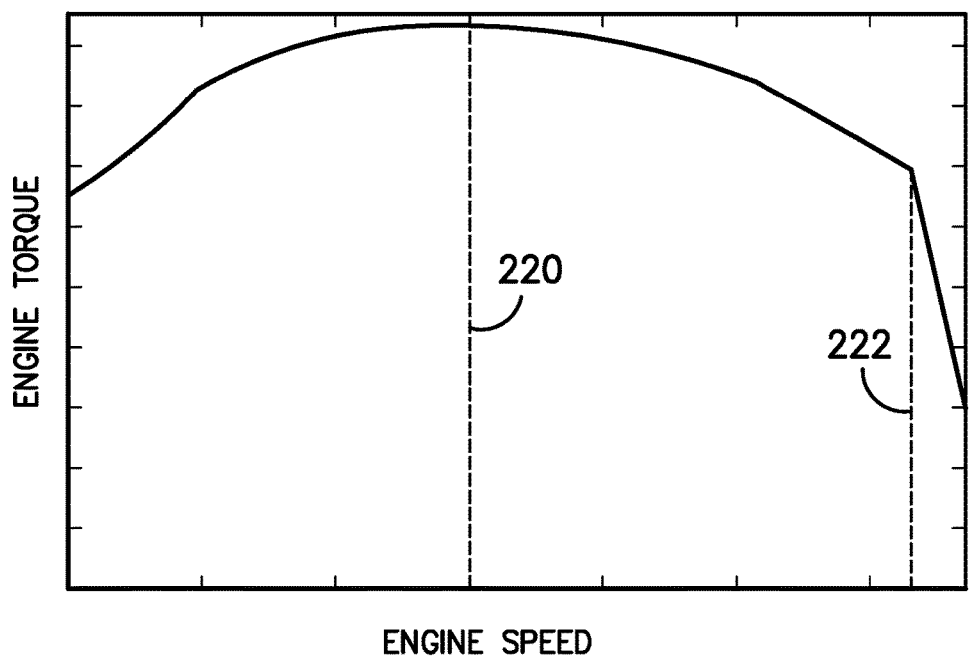
FIG. -5-
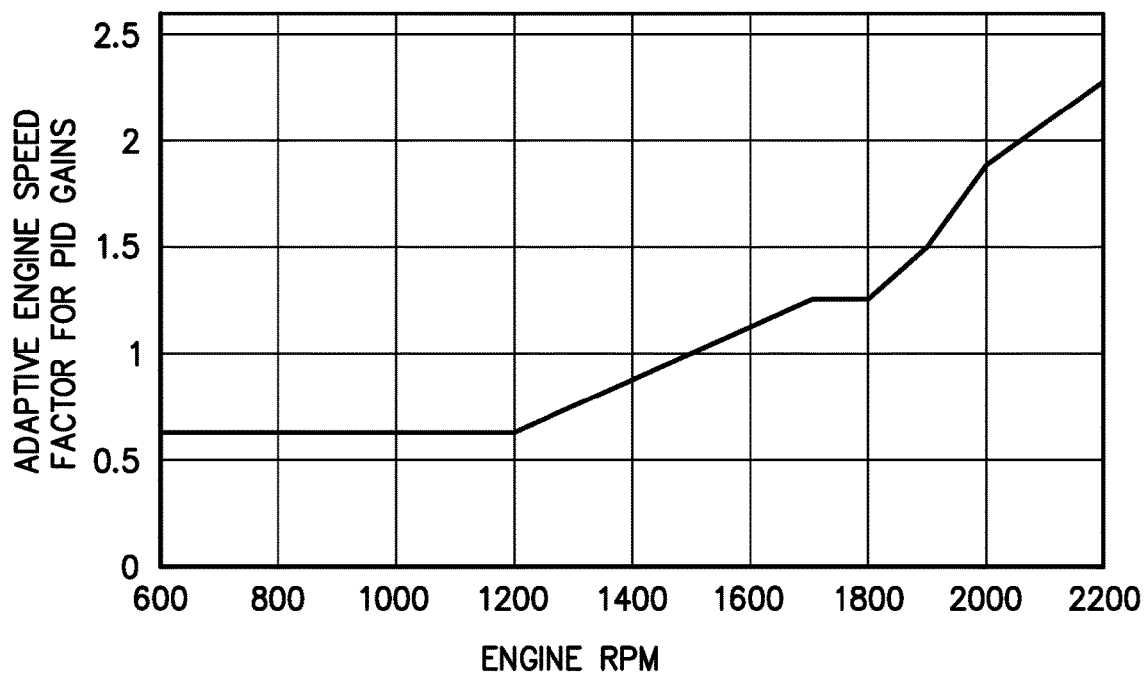
FIG. -6-

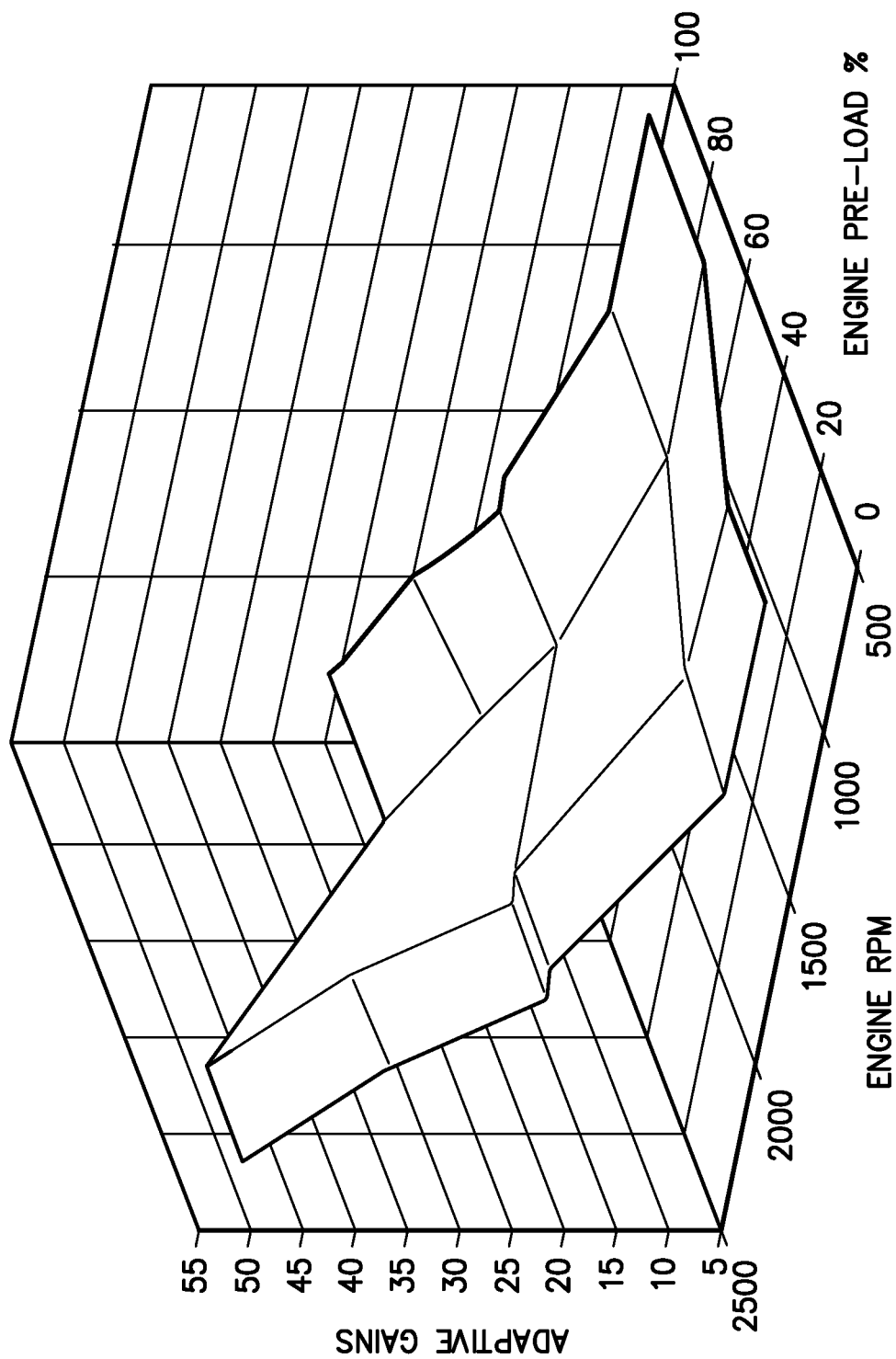
FIG. -7-

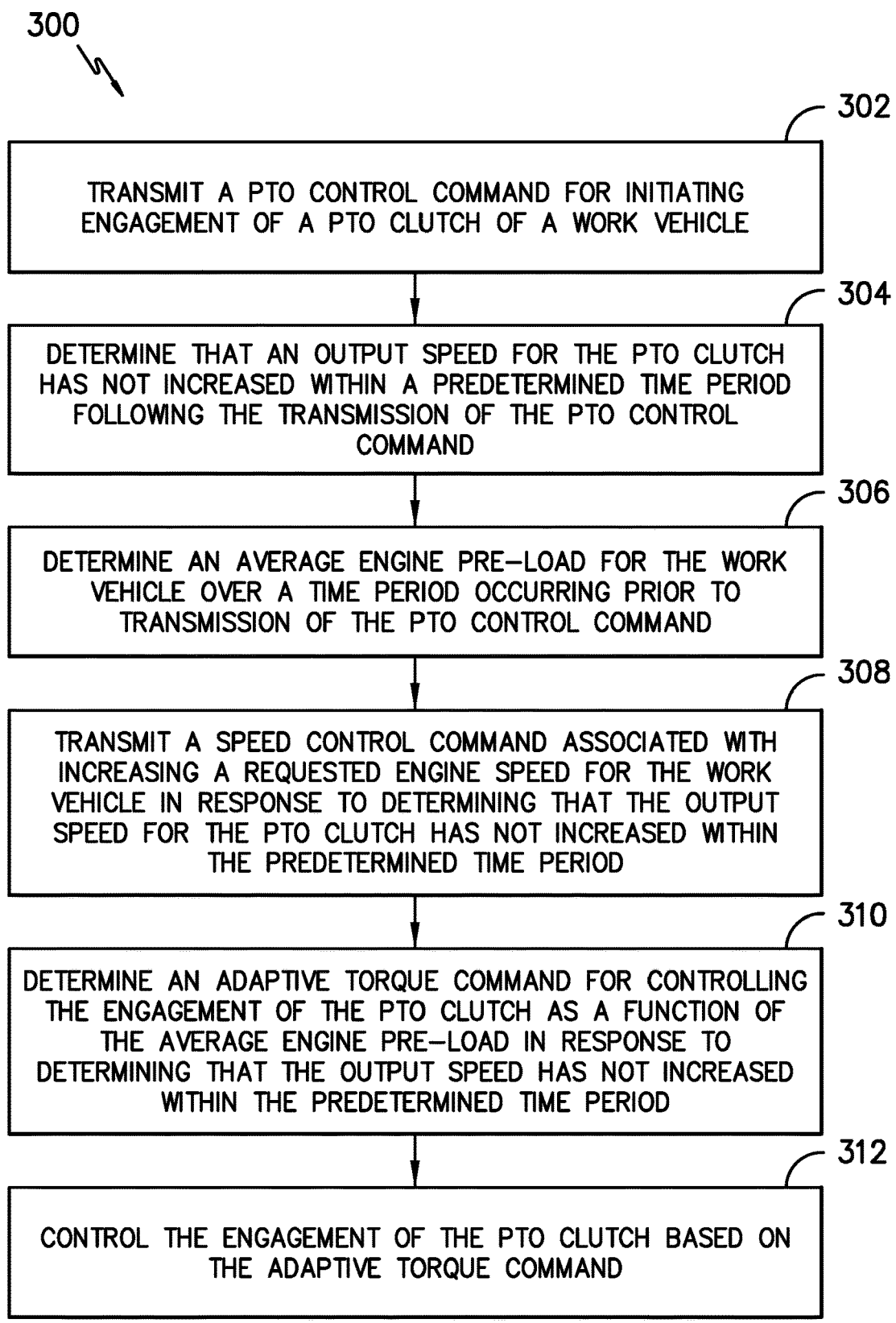
FIG. -8-

SYSTEM AND METHOD FOR CONTROLLING PTO CLUTCH ENGAGEMENT USING ADAPTIVE INCREMENTAL PID CONTROL

FIELD OF THE INVENTION

The present subject matter relates generally to work vehicles and, more particularly, to a system and method for providing adaptive incremental control of the engagement of a power take-off (PTO) clutch for a work vehicle to accommodate increased engine loads during clutch engagement while preventing engine stall.

BACKGROUND OF THE INVENTION

Current work vehicles, such as tractors and other agricultural vehicles, include an engine and a transmission, such as a power shift transmission (PST) or a continuously variable transmission (CVT), rotatably coupled to the engine. In addition, work vehicles typically include an electronic controller that is configured to control the operation of both the engine and the transmission to achieve desired operation. For example, an operator may provide an input to the controller selecting a desired ground speed for the work vehicle. Based on the operator input, the controller may be configured to automatically control the operation of the engine and/or the transmission such that the actual speed of the work vehicle matches the desired speed selected by the operator.

Additionally, work vehicles often include a power take-off (PTO) that is used to provide power to various implements, such as mowers, balers, forage harvesters and spreaders. Typically, PTOs are selectively connectable to a source of rotational power, such as the vehicle's engine, by a clutch that is configured to be automatically controlled via the electronic controller of the work vehicle. To date, many PTO clutch control systems have been developed that operate under a variety of control strategies designed to provide suitable functionality.

When engaging a PTO clutch, it is often necessary to achieve a relatively high torque (often referred to as the breakaway friction torque). In certain instances, this breakaway friction torque may be higher than the maximum available engine torque. When engine loads are relatively low, there is typically enough time to approach the peak engine torque and slide over the maximum engine torque curve to allow the breakaway friction torque to be reached during the clutch engagement process. However, with relative high engine loads, there is typically insufficient time to achieve the breakaway friction torque, which results in stalling of the engine without any engagement of the PTO clutch.

Accordingly, an improved system and method for providing adaptive incremental control of the engagement of a PTO clutch for a work vehicle in order to accommodate increased engine loads while preventing engine stall would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling engagement of a power take-off (PTO) clutch of a work vehicle. The method may include transmitting, by a computing device, a PTO control command for initiating engagement of the PTO clutch, determining, by the computing device, that an output speed for the PTO clutch has not increased within a predetermined time period following the transmission of the PTO control command, and determining, by the computing device, an average engine pre-load for the work vehicle over a time period occurring prior to transmission of the PTO control command. Moreover, in response to determining that the output speed for the PTO clutch has not increased within the predetermined time period following the transmission of the PTO control command, the method may include transmitting, by the computing device, a speed control command associated with increasing a requested engine speed for the work vehicle, determining, by the computing device, an adaptive torque command for controlling the engagement of the PTO clutch as a function of the average engine-pre-load, and controlling, by the computing device, the engagement of the PTO clutch based on the adaptive torque command.

In another aspect, the present subject matter is directed to a method for controlling engagement of a power take-off (PTO) clutch of a work vehicle. The method may include transmitting, by a computing device, a PTO control command for initiating engagement of the PTO clutch, determining, by the computing device, that a PTO output shaft speed has not increased within a predetermined time period following the transmission of the PTO control command and determining, by the computing device, an average engine pre-load for the work vehicle over a time period occurring prior to transmission of the PTO control command. Additionally, in response to determining that the PTO output shaft speed has not increased within the predetermined time period following the transmission of the PTO control command, the method may include transmitting, by the computing device, a speed control command associated with increasing a requested engine speed for the work vehicle, determining, by the computing device, an adaptive torque command for controlling the engagement of the PTO clutch based at least in part on incremental proportional-integral-derivative (PID) control logic, and controlling, by the computing device, the engagement of the PTO clutch based on the adaptive torque command. Moreover, the incremental PID control logic may use adaptive gains determined as a function of both the average engine pre-load and an engine speed for the work vehicle In a further aspect, the present subject matter is directed to a system for controlling clutch engagement for a work vehicle. The system may include a power take-off (PTO) clutch configured to rotationally couple a PTO clutch input shaft to a PTO clutch output shaft, a clutch valve configured to control engagement of the PTO clutch, and a controller communicatively coupled to the clutch valve. The controller may include a processor and associated memory. The memory may store instructions that, when implemented by the processor, configure the controller to transmit a PTO control command for initiating engagement of the PTO clutch, determine that an output speed for the PTO clutch output shaft has not increased within a predetermined time period following the transmission of the PTO control command, and determine an average engine pre-load for the work vehicle over a time period occurring prior to transmission of the PTO control command. Moreover, in response to determining that the output speed for the PTO clutch output shaft has not increased within the predetermined time period, the controller may be configured to transmit a speed control command associated with increasing a requested engine speed for the work vehicle, determine an adaptive torque command for controlling the engagement of the PTO clutch as a function of the average engine-pre-load, and control the engagement of the PTO clutch based on the adaptive torque command.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a work vehicle in accordance with aspects of the present subject matter;

FIG. 2 illustrates a schematic view of one embodiment of a system for controlling the engagement of a PTO clutch of a work vehicle in accordance with aspects of the present subject matter;

FIG. 3 illustrates a block diagram of one embodiment of PID control logic that may be implemented by a controller of the disclosed system to control the engagement of a PTO clutch in accordance with aspects of the present subject matter;

FIG. 4 illustrates a graphical representation of one embodiment of an example relationship that may be established between PID control gains and engine pre-load in accordance with aspects of the present subject matter;

FIG. 5 illustrates a graphical representation of one embodiment of an exemplary speed-torque curve for an engine of a work vehicle in accordance with aspects of the present subject matter;

FIG. 6 illustrates a graphical representation of one embodiment of an example relationship that may be established between PID control gains and engine speed in accordance with aspects of the present subject matter;

FIG. 7 illustrates a graphical representation of one embodiment of an example relationship correlating PID control gains to both engine pre-load and engine speed in accordance with aspects of the present subject matter;

FIG. 8 illustrates a flow diagram of one embodiment of a method for controlling the engagement of a PTO clutch of a work vehicle in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for providing adaptive incremental control of the engagement of a PTO clutch for a work vehicle. Specifically, in several embodiments, the disclosed system and method allow for adaptive control of PTO clutch engagement as a function of the loading on the engine prior to engagement of the PTO clutch being requested (referred to herein as "engine pre-load"). Such adaptive engagement control may account for the sensitivity of engine droop to engine pre-load. In addition, the system and method may also control the PTO clutch engagement as a function of the engine speed and the associated clutch engagement time. By adaptively controlling the PTO clutch engagement in the manner described herein, the present subject matter can prevent engine stalls while allowing PTO engagement to be more achievable under heavy or increased engine loads (e.g., due to driving and/or hydraulic loads).

In one embodiment, the disclosed control algorithm may be configured to determine an average engine pre-load prior to engagement of the PTO clutch being commanded, such as by averaging the engine loads over a given time period (e.g., a time period ranging from about 0.1 seconds or about 2 seconds) immediately prior to engagement of the PTO clutch being commanded. A lookup functionality may then be used to tune the aggressiveness or the curve of the PTO clutch engagement as a function of the average engine pre-load. For example, an adaptive gain(s) may be determined based on the average engine pre-load that is input into corresponding incremental proportional-integral-derivative (PID) control logic for controlling the PTO clutch engagement.

Additionally, in one embodiment, the output shaft speed for the PTO clutch may be monitored and utilized as feedback signal to the control loop. In such an embodiment, if it is determined that the output shaft speed remains at zero for a predetermined time period (e.g., a maximum fill time for the PTO clutch) following engagement of the PTO clutch being commanded, the disclosed PID control logic may be implemented to provide adaptive incremental torque commands for controlling the PTO clutch engagement. Moreover, the requested engine speed may also be increased, which may, in turn, increase the rate at which the local peak of the engine torque can be reached. In this regard, the PID control logic may also be configured to tune or adjust the PTO clutch engagement based on the difference between the requested engine speed and the actual engine speed. For example, in one embodiment, the adaptive gains utilized within the PID control logic may be determined as a function of both the average engine pre-load and the engine speed.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control or input devices 20, 21, 22 (e.g., levers, pedals, control panels, buttons and/or the like) for permitting an operator to control the operation of the work vehicle 10. For instance, as shown in FIG. 1, the work vehicle 10 may include an input lever 20 for controlling the engine speed of the vehicle 10 and a clutch pedal 21. In addition, the work vehicle 10 may include a control panel 22 for displaying message windows and/or alerts to the operator and/or for allowing the operator to interface with the vehicle's controller. For instance, in one embodiment, the control panel 22 may include buttons, knobs and/or any other suitable input devices that allow the operator to provide user inputs to the controller, such as by allowing the operator to provide a PTO engagement input instructing the controller to engage a PTO clutch (not shown in FIG. 1) of the work vehicle 10.

Moreover, the work vehicle 10 may also include an engine 23 and a transmission 24 mounted on the chassis 16. The transmission 24 may be operably coupled to the engine 23 and may provide variably adjusted gear ratios for transferring engine power to the wheels 14 via a drive axle assembly 26. The engine 23, transmission 24, and drive axle assembly 26 may collectively define a drivetrain 28 of the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 23, transmission 24, and differential 26 are coupled, a configuration common in smaller tractors. Still other configurations may use an articulated chassis to steer the work vehicle 10, or rely on tracks in lieu of the wheels 12, 14. Additionally, as will be described below, the work vehicle 10 may also be configured to be operably coupled to any suitable type of work implement.

Referring now to FIG. 2, a schematic diagram of one embodiment of a system 100 for controlling the clutch engagement of a power take-off (PTO) of a work vehicle 10 is illustrated in accordance with aspects of the present subject matter. As shown, the system 100 may include an engine 102 (e.g., the engine 23 of the work vehicle 10 described above) rotatably coupled to an implement 104 via a power take-off (PTO) system 106. In general, the PTO system 106 may be configured to transfer power from the engine 102 to the implement 104 so as to rotationally drive the implement 104. It should be appreciated that the implement 104 may generally correspond to any suitable implement configured to be coupled to a given work vehicle. For example, common PTO-driven implements include, but are not limited to, balers, mowers, grinder mixers, augers, drills, blowers, feeders and/or the like.

As shown in FIG. 2, the PTO system 106 may include a PTO clutch 108 configured to selectively couple the engine 102 to the corresponding PTO-driven implement 104. Specifically, as shown in the illustrated embodiment, an output shaft 110 of the engine 102 may be rotatably coupled to a PTO clutch input shaft 112 of the PTO clutch 108 (e.g., via one or more PTO input gears 114), which is, in turn, configured to be rotatably engaged with a corresponding PTO clutch output shaft 116 of the PTO system 106 via the PTO clutch 108. Additionally, the PTO clutch output shaft 116 may be rotatably coupled to a corresponding implement input shaft 118 (e.g., via one or more PTO output gears 120). Thus, by engaging the PTO clutch 108 such that the PTO clutch input and output shafts 112, 116 are rotatably coupled to one another, power from the engine 102 may be transmitted through the PTO system 106 to the implement 104. Similarly, power transmission from the engine 102 to the implement 104 may be cut-off by disengaging the PTO clutch 108 such that the PTO clutch input and output shafts 112, 116 are effectively decoupled from one another. As is generally understood, the PTO clutch 108 may include a plurality of friction plates 109 configured to be engaged within the clutch 108 for transmitting torque between the PTO clutch input and output shafts 112, 116.

In several embodiments, the PTO clutch 108 may correspond to a hydraulically-actuated clutch. Thus, as shown in FIG. 2, the system 100 may also include a clutch valve 122 (e.g., a current-controlled pressure reducing valve) configured to regulate the supply of hydraulic fluid to the PTO clutch 108, thereby allowing for the engagement and disengagement of the clutch 108 to be electronically controlled. For example, as will be described below, the current supplied to the clutch valve 122 may be directly proportional to the pressure of the hydraulic fluid supplied to the PTO clutch 108, which is, in turn, proportional to the amount of torque transmitted through the clutch 108.

It should be appreciated that the configuration of the PTO system 106 shown in FIG. 2 is simply provided to illustrate one example of a suitable PTO configuration. In general, the system and method described herein may be applied to control the clutch engagement of a PTO system having any suitable configuration that allows power to be transmitted from the engine of a work vehicle to an associated implement, including any of the various PTO system configurations currently known in the art. It should also be appreciated that a work vehicle may be configured to have multiple PTO systems. For example, a work vehicle may include both a front PTO system for transferring power from the engine to an implement positioned in the front of the vehicle and a rear PTO system for transferring power from the engine to an implement positioned in the rear of the vehicle. In addition, PTO systems may also include more than one PTO clutch.

As shown in FIG. 2, the system 100 may also include a controller 124 configured to control the operation of one or more components of the work vehicle 10, such as the engine 102 and the PTO clutch 108. For example, the controller 124 may be communicatively coupled to an engine governor 126 in order to control and/or monitor the speed and/or torque of the engine 102. Similarly, the controller 124 may be communicatively coupled to the clutch valve 122 in order to control the operation of the PTO clutch 108. For instance, the controller 124 may be configured to transmit suitable current commands to the clutch valve 122 for controlling the engagement and/or disengagement of the PTO clutch 108.

It should be appreciated the controller 124 may generally comprise any suitable processor-based device known in the art, such as one or more computing devices. Thus, in several embodiments, the controller 124 may include one or more processor(s) 128 and associated memory 130 device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 130 of the controller 124 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 130 may generally be configured to store suitable computer-readable instructions that, when implemented by the processor(s) 128, configure the controller 124 to perform various computer-implemented functions, such as the control logic described below with reference to FIG. 3 and/or the method described below with reference to FIG. 8. In addition, the controller 124 may also include various other suitable components, such as a communications circuit or module, one or more input/output channels, a data/control bus and/or the like.

It should also be appreciated that the controller 124 may correspond to an existing controller of the work vehicle 10 (e.g., an existing engine and/or transmission controller) or the controller 124 may correspond to a separate controller. For instance, in one embodiment, the controller 124 may form all or part of a separate plug-in module that may be installed within the work vehicle 10 to allow for the disclosed system and method to be implemented without requiring additional software to be uploaded onto existing control devices of the vehicle 10.

The system 100 may also include one or more sensors for monitoring various operating parameters of the work vehicle 10. For example, as shown in FIG. 2, the controller 124 may be communicatively coupled to various sensors, such as a torque sensor 132 and/or a speed sensor 134, mounted on and/or within the engine 102 for monitoring the engine torque loads and/or the engine speed. In one embodiment, the sensor(s) 132, 134 may comprise an internal sensor of the engine governor 126. In another embodiment, the system 100 may include any other suitable sensor(s) configured to monitor the torque loads and/or the speed of the engine 102. For instance, a suitable sensor 136 may be provided in association with the output shaft 110 of the engine 102 for monitoring the current engine speed (e.g., in RPMs).

Moreover, the system 100 may also include one or more sensors 138, 140 (e.g., shaft encoders, shaft sensors and/or any other suitable sensors) configured to monitor the rotational speeds or angular velocities of the various shafts of the PTO system 106. For example, as shown in FIG. 2, the system 100 may include a first speed sensor 138 mounted to and/or within the PTO clutch input shaft 112 for monitoring the angular velocity or input speed of the PTO system 106 and a second speed sensor 140 mounted to and/or within the PTO clutch output shaft 116 for monitoring the angular velocity or output speed of the PTO system 106. The speed sensors 138, 140 may, in turn, be communicatively coupled to the controller 124 to permit the speed measurements to be transmitted to the controller 124 for subsequent processing and/or analysis. In other embodiments, as an alternative to including the first speed sensor 138, the input speed of the PTO system 106 may be determined based on the engine speed. For instance, by knowing the gear ratio provided between the engine output shaft 110 and the PTO clutch input shaft 112, the input speed of the PTO system 106 may be calculated based on the monitored engine speed.

In addition, the system 100 may include various other sensors configured to monitor any other suitable operating parameters of the work vehicle 10. For example, in one embodiment, a sensor 142 may be associated with the PTO clutch output shaft 116 and/or the input shaft 118 associated with the implement 104 for monitoring the torque transmitted through the PTO system 106 to the implement 104.

As shown in FIG. 2, the system 100 may also include one or more input devices 144, 146 communicatively coupled to the controller 124 to allow operator inputs to be provided to the system 100. For example, as indicated above, the work vehicle 10 may include an input device 144 (e.g., input lever 20 shown in FIG. 1) configured to permit an operator to input a speed command corresponding to a desired engine speed for the vehicle 10. Upon receipt of the speed command, the controller 124 may be configured to control the operation of the engine 102 in order to achieve the commanded or requested engine speed. Similarly, as indicated above, the work vehicle 10 may include a suitable input device 146 (e.g., a button, switch or other suitable input device positioned on the control panel 22 shown in FIG. 1) to allow the operator to input a PTO-related command for engaging and/or disengaging the PTO clutch 108. For instance, upon receipt of a PTO engagement input from the operator, the controller 124 may be configured to control the operation of the clutch valve 122 so as to engage the PTO clutch 108, thereby allowing power to be transferred from the engine 102 to the associated implement 104.

As indicated above, in one embodiment, the controller 124 may be configured to monitor the torque transmitted through the PTO clutch 108 using one or more torque sensors 142. In such an embodiment, the torque sensor(s) 142 may be configured to transmit measurement signals to the controller 124 as the PTO clutch 108 is being engaged, thereby allowing the controller 124 to continuously monitor the clutch torque during the engagement process.

As an alternative to directly measuring the clutch torque, the controller 124 may be configured to calculate or estimate the clutch torque based on one or more operating variables or parameters for the work vehicle 10 and one or more known constants associated with the PTO clutch. For example, in one embodiment, the clutch torque may be calculated by the controller 124 using the following equation (Equation 1):

$$T = \mu_{dyn} * N * P * A * R_{eq} * \text{sgn}|\omega_{rel}| \quad (1)$$

wherein, T corresponds to the clutch torque, $\mu_{dyn}$ corresponds to the kinetic friction coefficient for the friction surfaces within the PTO clutch 108, N corresponds to the number of friction surfaces within the PTO clutch 108, P corresponds to the pressure of the hydraulic fluid supplied to the PTO clutch 108 by the clutch valve 122, A corresponds to the engagement surface area of the friction surfaces within the PTO clutch 108, $R_{eq}$ corresponds to the effective torque radius for the PTO clutch 108, and $\omega_{rel}$ corresponds to the relative angular velocity for the PTO clutch 108.

It should be appreciated that several of the inputs into Equation 1 may correspond to known values stored within the memory 130 of the controller 124. For example, the kinetic friction coefficient ($\mu_{dyn}$), the number of friction surfaces (N), the engagement surface area (A), and the effective torque radius ($R_{eq}$) may correspond to known values that are pre-stored within or input into the memory 130 of the controller 124 based on the specific configuration of the PTO clutch 108. As is generally understood, the effective torque radius ($R_{eq}$) for the PTO clutch 108 may be calculated according to the following equation (Equation 2):

$$R_{eq} = \frac{2}{3} \frac{R_o^3 - R_i^3}{R_o^2 - R_i^2} \quad (2)$$

wherein, $R_{eq}$ corresponds to the effective torque radius, $R_o$ corresponds to the outer radius of the friction surfaces within the PTO clutch 108, and $R_i$ corresponds to the inner radius of the friction surfaces within the PTO clutch 108.

It should also be appreciated that various other inputs into Equation 1 may correspond to variables or parameters that are continuously monitored by or otherwise available to the controller 124. For instance, as indicated above, the pressure (P) of the hydraulic fluid supplied to the PTO clutch 108 is directly proportional to the current command supplied to the clutch valve 122 by the controller 124. Thus, by knowing the current command supplied to the clutch valve 122, the controller 124 may determine the current pressure of the hydraulic fluid being supplied to the PTO clutch 108 (e.g., by using a look-up table or mathematical function stored within the controller's memory 130). Similarly, the controller 124 may be configured to determine the relative angular velocity ($c\omega_{rel}$) for the PTO clutch 108 based on the monitored angular input and output velocities associated with the PTO clutch 108. For example, as indicated above, the controller 124 may be communicatively coupled to first and second speed sensors 140, 142 for monitoring the angular input and output velocities for the PTO system 106. In such instance, the controller 124 may be configured to calculate the relative angular velocity ($\omega_{rel}$) for the PTO clutch 108 using the following equation (Equation 3):

$$\omega_{rel} = \omega_i - \omega_o \quad (3)$$

wherein, $\omega_{rel}$ corresponds to the relative angular velocity, $\omega_i$ corresponds to the angular input speed for the PTO clutch 108, and $\omega_o$ corresponds to the angular output speed for the PTO clutch 108.

In several embodiments, the controller 124 may be configured to control the engagement of the PTO clutch 108 according to an incremental proportional-integral-derivative (PID) feedback control loop when the output shaft 116 for the PTO clutch 108 does not begin to rotate within a predetermined period of time following clutch engagement being commanded. Specifically, in accordance with aspects of the present subject matter, the output speed of the PTO clutch output shaft 116 may be monitored along with the clutch engagement time (i.e., the time elapsed since clutch engagement was commanded) and utilized as feedback signals into the disclosed control algorithm. In this regard, the controller 124 may be configured to monitor the elapsed clutch engagement time relative to a predetermined maximum fill time for the PTO clutch 108. In the event that the output speed for the PTO clutch 108 remains at zero when the clutch engagement time reaches the maximum fill time for the PTO clutch 108, the controller 124 may be configured to implement the disclosed PID feedback control loop to allow adaptive incremental torque commands to be generated for controlling the engagement of the PTO clutch 108.

As is generally understood, when functioning as a PID controller, the controller 124 may be configured to continuously calculate an error value as the difference between a measured process variable and a desired setpoint. For example, in accordance with aspects of the present subject matter, the controller 124 may be configured to implement PID control law that is used to determine a torque increment based on a current torque value ($T_k$) for the PTO clutch 108 (e.g., as measured via the torque sensor(s) and/or as determined using Equation 1). In such an embodiment, the commanded torque ($T_{k+1}$) for the PTO clutch 108 may, for example, be calculated as the sum of the current PTO clutch torque ($T_k$) and the torque increment calculated or determined by the controller 124 using the PID control law. For example, in one embodiment, the commanded torque ($T_{k+1}$) may be defined according to the following equation (Equation 4).

$$T_{k+1} = T_k \text{PID}(n_{gear}) \quad (4)$$

wherein, $T_{k+1}$ corresponds to the commanded torque value for the PTO clutch 108, $T_k$ corresponds to the current torque for the PTO clutch 108, and PID($n_{gear}$) corresponds to the torque increment calculated according to the PID control law, where PID indicates the adaptive gains associated with the PID control logic and $n_{gear}$ corresponds to the gear ratio across the PTO clutch 108. It should be appreciated that point k may be the time of measurement, and point k+1 may be the point of the next measurement, the next clock cycle, or a point in time after the controller 124 has taken action (e.g., at least one iteration). It should also be appreciated that the aggressiveness of the clutch engagement may be considered in the PID coefficients of the controller 124, where increased aggressiveness may result in higher gains.

Referring now to FIG. 3, a block diagram of one embodiment of control logic 200 that may be implemented by the controller 124 for controlling the engagement of the PTO clutch 108 is illustrated in accordance with aspects of the present subject matter. In particular, FIG. 3 illustrates a block diagram for implementing a modulation mode for the clutch engagement process in which the controller 124 functions to provide the incremental torque command using the PID control law described above with reference to Equation 4.

In general, the output speed for the PTO clutch 108 will be zero when there is no clutch engagement (e.g., the PTO input shaft 112 is rotating, but the PTO output shaft 116 is not rotating). Additionally, the target normalized output speed for the PTO clutch 108 for full engagement is 1. As shown at block 202 in FIG. 3, the target output speed for the PTO 108 clutch may be determined by the controller 124 as a function of the commanded torque as time (t) ranges from zero to time ($t_{agg}$), where ($t_{agg}$) is the time elapsed since clutch engagement was commanded (i.e., the "clutch engagement time"). Additionally, as shown in FIG. 3, a measured or actual output speed of the PTO clutch 108 may be received as feedback based on the PTO clutch dynamics (e.g., at block 204). The target output speed and the measured output speed may then be compared (e.g., at difference block 206), with the difference or error between the speed values being input into the PID controller (e.g., block 208). The power saturation (e.g., the power output of the engine 102 as a ratio of the power rating of the PTO clutch 108) may be determined at block 210 and fed back to the PID controller (block 208).

As indicated above, the PID controller (block 208) outputs an incremental torque value (PID($n_{gear}$)), which may be added (e.g., at summation block 212) to the measured or determined current torque value ($T_k$) or a parameter indicative of torque (block 214), to generate the commanded torque ($T_{k+1}$), as discussed above with reference to Equation 4. In general, the commanded torque ($T_{k+1}$) may be proportional to the pressure of the hydraulic fluid supplied to the PTO clutch 108 (e.g., as indicated above with reference to Equation 1), which, in turn, is proportional to the current supplied to the clutch valve 122. Thus, using a suitable equation or look-up table, the controller 124 may determine the current command or control signal to be transmitted to the clutch valve 122 to achieve the commanded torque ($T_{k+1}$).

Additionally, in several embodiments, the aggressiveness or the curve of the PTO clutch engagement may be determined as a function of the engine pre-load (i.e., the engine loads occurring prior to engagement of the PTO clutch 108 being engaged). Specifically, when the PTO clutch 108 is commanded to provide a given torque, the reaction of the engine 102 or the "engine droop rate" may depend on the engine pre-load. For example, a higher engine pre-load will lead to a quicker drop in the engine speed, which can prevent the engine 102 from reaching the engine torque required for engagement of the PTO clutch 108. In addition, the quick reduction in the engine speed may also lead to engine stalling. Thus, in accordance with aspects of the present subject matter, the gains applied by the PID controller 124 may be determined as a function of the engine pre-load. For instance, an adaptive lookup table may be utilized that correlates the PID gains to the engine pre-load. For example, FIG. 4 illustrates a graphical view of an example relationship that may be used to correlate the PID gains to the engine pre-load. As shown, the example relationship allows for the PID gains to be reduced as the engine pre-load increases. Such a relationship may reduce the aggressiveness of the control algorithm for higher engine pre-loads, thereby providing additional time during the clutch engagement process for increasing the engine torque sufficiently to allow for engagement of the PTO clutch 108.

As indicated above, in several embodiments, the engine pre-load may be expressed as an average engine pre-load over a time period occurring prior to the transmission of the control command for initiating engagement of the PTO clutch. For example, in one embodiment, the controller 124 may be configured to calculate an average engine pre-load for use within the PID control logic by averaging the engine loads occurring across a predetermined time period immediately prior to the transmission of the PTO engagement control command. For instance, the controller 124 may be configured to average the engine loads across a time period ranging from about 0.1 seconds to about 2 seconds prior to the transmission of the PTO engagement control command.

Moreover, in one embodiment, the aggressiveness or the curve of the PTO clutch engagement may also be determine as a function of the engine speed to ensure that the engine 102 does not stall during clutch engagement. For example, FIG. 5 illustrates an example graph of engine torque versus engine speed, with the x-axis representing engine speed and the y-axis representing engine torque. As shown, when the engine speed is equal to or greater than a first threshold engine speed (e.g., line 220, which may, for example, correspond to about 1500 RPM), the engine operation may be considered more stable because any increase in the engine torque will result in a reduction of the engine speed. Additionally, as shown in FIG. 5, if the engine speed is between the first speed threshold 220 and a second speed threshold (e.g., line 222, which may, for example, correspond to about 2100 RPM), reductions in the engine speed will increase the available torque provided by the engine. As a result, since the engine 102 is capable of recovering and balancing the load, the aggressiveness of the PTO clutch engagement may be significantly high within such engine speed range However, if the engine speed is less than the first speed threshold 220, decreases in the engine speed due to increases in the engine loading result in a reduction of the available engine torque, which can lead to stalling of the engine 102 during the clutch engagement process.

Thus, in several embodiments, the gains applied by the PID controller 124 may be determined as a function of the engine speed. For instance, an adaptive lookup table may be utilized that correlates the PID gains to engine speed. For example, FIG. 6 illustrates a graphical view of an example relationship that may be used to correlate the PID control gains to the engine speed. As shown, the example relationship allows for the PID gains to be increased as the engine speed increases. Such a relationship may increase the aggressiveness of the control algorithm when operating at higher engine speeds and reduce the aggressiveness when operating at lower engine speeds. Accordingly, when engine speed is reduced to due to higher engine loads, the aggressiveness of the clutch engagement may be reduced to prevent engine stall.

Referring now to FIG. 7, a three-dimensional graphical representation of an example relationship that plots adaptive PID control gains that may be used within the disclosed control algorithm as a function both engine speed and engine pre-load is illustrated in accordance with aspects of the present subject matter. In one embodiment, the example relationship shown in FIG. 7 may incorporate the example relationships described above with reference to FIGS. 4 and 6. For instance, the PID gains may be increased with both reductions in the engine pre-load and increases in the engine speed, thereby increasing the aggressiveness of the clutch engagement when operating conditions are less likely to result in engine stall. However, as shown in FIG. 7, the PID gains may be decreased with both increases in the engine pre-load and decreases in the engine speed, thereby reducing the aggressiveness in an attempt to complete the engagement of the PTO clutch 108 while preventing engine stall.

Referring now to FIG. 8, a flow diagram of one embodiment of a method 300 for controlling the engagement of a PTO clutch of a work vehicle is illustrated in accordance with aspects of the present subject matter. In general, the method 300 will be described herein with reference to the system 100 described above with reference to FIG. 2. However, it should be appreciated by those of ordinary skill in the art that the disclosed method 300 may be implemented within any other system. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (302), the method 300 includes transmitting a PTO control command for initiating engagement of a PTO clutch of a work vehicle. In several embodiments, the clutch engagement process may be initiated upon receipt by the controller 124 of a suitable operator-initiated input. For example, as indicated above, a suitable input device 146 may be provided to allow the operator to transmit commands instructing the controller 124 to engage and/or disengage the PTO clutch 108. Thus, when an operator-initiated PTO engagement command is received, the controller 124 may be configured to initiate engagement of the PTO clutch 108 by transmitting a suitable current command(s) to the clutch valve 122 for adjusting the pressure of the hydraulic fluid supplied to the clutch 108. As indicated above, the current commands transmitted to the clutch valve 122 may be directly proportional to the pressure of the hydraulic fluid supplied to the PTO clutch 108, which is, in turn, proportional to the amount of torque transmitted through the clutch 108.

It should be appreciated that, in one embodiment, the controller 124 may be configured to initiate engagement of the PTO clutch 108 by initially increasing the current supplied to the clutch valve 122 at a predetermined ramp-up rate for a relatively short period of time. Typically, the controller 124 may be configured to increase the current supplied to the clutch valve 122 at the predetermined rate until it is detected that the PTO clutch output shaft 116 is rotating at a predetermined minimum engagement speed, thereby indicating that the PTO clutch 108 has been actuated beyond its kiss point and is partially engaged. At such point, the controller 124 may, for example, be configured to continue to increase the current supplied to the clutch valve 122 according to a given schedule to allow the pressure supplied to the PTO clutch 108 to be increased to facilitate further engagement of the clutch 108. However, as indicated above, under higher loading conditions, the PTO clutch 108 may not even partially engage within the maximum fill time associated with the PTO clutch 108 such that the output speed for the PTO clutch output 108 remains at zero.

As shown in FIG. 8, at (304), the method 300 may include determining that an output speed for the PTO clutch has not increased within a predetermined time period following the transmission of the PTO control command. For example, the controller 124 may be configured to monitor the output speed for the PTO clutch 108 as the current supplied to the clutch valve 122 is being increased to determine whether the output shaft 116 begins to rotate, thereby indicating that the PTO clutch is at least partially engaged. As indicated above, if the output seed remains at zero following the expiration of the maximum fill time associated with the PTO clutch 108, the controller 124 may be configured to transition to the disclosed adaptive incremental PID control logic for controlling the engagement of the PTO clutch 108.

Additionally, at (306), the method 300 may include determining an average engine pre-load for the work vehicle over a time period occurring prior to transmission of the PTO control command. For instance, as indicated above, the controller 124 may be configured to average the engine loads over a predetermined time period occurring immediately prior to initiating the clutch engagement process to calculate the average engine pre-load for the engine 102.

Moreover, at (308), the method 300 may transmitting a speed control command associated with increasing a requested engine speed for the work vehicle in response to determining that the output speed for the PTO clutch has not increased within the predetermined time period. For example, as indicated above, by increasing the engine speed, the engine 102 may be able to reach its maximum engine torque much faster, thereby helping to facilitate engagement of the PTO clutch 108 during heavy loading conditions. Thus, when it is determined that the PTO clutch 108 has not yet engaged within the predetermined time period (thereby providing an indication of high loading conditions), the controller 124 may transmit suitable control signals for increasing the engine speed.

Referring still to FIG. 8, at (310), the method 300 may include determining an adaptive torque command for controlling the engagement of the PTO clutch as a function of the average engine-pre-load in response to determining that the output speed for the PTO clutch has not increased within the predetermined time period. For example, in one embodiment, the controller 124 may be configured to determine the adaptive torque command using the PID control logic described above, with the PID control gains being determined as a function of the average engine pre-load (and, optionally, the engine speed). For instance, as described above with reference to Equation 4, the adaptive torque command may correspond to the sum of the current torque value for the PTO clutch 108 and the incremental torque value determined via the PID control logic.

Additionally, at (312), the method 300 may include controlling the engagement of the PTO clutch based on the adaptive torque command. For instance, as indicated above, the controller 124 may be configured to determine a current command for the clutch valve 122 based on the calculated torque command (e.g., via a suitable lookup table). The current command may then be transmitted to the clutch valve 122 for adjusting the pressure of the hydraulic fluid supplied to the clutch 108, thereby allowing for the engagement of the PTO clutch 108 to be controlled.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling engagement of a power take-off (PTO) clutch of a work vehicle, the method comprising:
   transmitting, by an electronic controller, a PTO control command for initiating engagement of the PTO clutch;
   determining, by the electronic controller, that an output speed for the PTO clutch has not increased within a first predetermined time period following the transmission of the PTO control command;
   determining, by the electronic controller, an average engine pre-load for the work vehicle over a time period occurring prior to transmission of the PTO control command;
   in response to determining that the output speed for the PTO clutch has not increased within the first predetermined time period following the transmission of the PTO control command:
   transmitting, by the electronic controller, a speed control command associated with increasing a requested engine speed for the work vehicle;
   determining, by the electronic controller, an adaptive torque command for controlling the engagement of the PTO clutch as a function of the average engine pre-load; and
   controlling, by the electronic controller, the engagement of the PTO clutch based on the adaptive torque command.

2. The method of claim 1, wherein determining the adaptive torque command comprises:
   determining a current torque value for the PTO clutch;
   determining an incremental torque value based at least in part on the average engine pre-load; and
   determining the adaptive torque command as a sum of the current torque value and the incremental torque value.

3. The method of claim 2, wherein determining the incremental torque value comprises determining the incremental torque value using incremental proportional-integral-derivative (PID) control logic.

4. The method of claim 3, wherein the incremental PID control logic uses adaptive gains determined as a function of the average engine pre-load.

5. The method of claim 4, wherein the adaptive gains for the incremental PID control logic increase with reductions in the average engine pre-load and decrease with increases in the average engine pre-load.

6. The method of claim 4, wherein the adaptive gains for the incremental PID control logic are determined as a function of both the average engine pre-load and an engine speed for the work vehicle.

7. The method of claim 6, wherein the adaptive gains for the incremental PID control logic increase with both reductions in the average engine pre-load and increases in the engine speed and wherein the adaptive gains for the incremental PID control logic decrease with both increases in the average engine pre-load and reductions in the engine speed.

8. The method of claim 2, wherein determining the current torque value for the PTO clutch comprises monitoring the current torque value using a torque sensor or calculating the current torque value based on at least one monitored parameter associated with the current torque value.

9. The method of claim 1, wherein determining the average engine pre-load comprises averaging engine loads for the work vehicle across a second predetermined time period occurring immediately prior to the transmission of the PTO control command.

10. The method of claim 1, wherein determining that the output speed for the PTO clutch has not increased within the first predetermined time period following the transmission of the PTO control command comprises determining that the output speed for the PTO clutch has remained at zero speed across a maximum fill time for the PTO clutch following the transmission of the PTO control command.

11. A method for controlling engagement of a power take-off (PTO) clutch of a work vehicle, the method comprising:
transmitting, by an electronic controller, a PTO control command for initiating engagement of the PTO clutch;
determining, by the electronic controller, that a PTO output shaft speed has not increased within a predetermined time period following the transmission of the PTO control command;
determining, by the electronic controller, an average engine pre-load for the work vehicle over a time period occurring prior to transmission of the PTO control command;
in response to determining that the PTO output shaft speed has not increased within the predetermined time period following the transmission of the PTO control command:
transmitting, by the electronic controller, a speed control command associated with increasing a requested engine speed for the work vehicle;
determining, by the electronic controller, an adaptive torque command for controlling the engagement of the PTO clutch based at least in part on incremental proportional-integral-derivative (PID) control logic, the incremental PID control logic using adaptive gains determined as a function of both the average engine pre-load and an engine speed for the work vehicle; and
controlling, by the electronic controller, the engagement of the PTO clutch based on the adaptive torque command.

12. The method of claim 11, wherein the adaptive gains for the incremental PID control logic increase with both reductions in the average engine pre-load and increases in the engine speed and wherein the adaptive gains for the incremental PID control logic decrease with both increases in the average engine pre-load and reductions in the engine speed.

13. A system for controlling clutch engagement for a work vehicle, the system comprising:
a power take-off (PTO) clutch configured to rotationally couple a PTO clutch input shaft to a PTO clutch output shaft;
a clutch valve configured to control engagement of the PTO clutch; and
a controller communicatively coupled to the clutch valve, the controller including a processor and associated memory, the memory storing instructions that, when implemented by the processor, configure the controller to:
transmit a PTO control command for initiating engagement of the PTO clutch;
determine that an output speed of the PTO clutch output shaft has not increased within a first predetermined time period following the transmission of the PTO control command;
determine an average engine pre-load for the work vehicle over a time period occurring prior to transmission of the PTO control command;
in response to determining that the output speed of the PTO clutch output shaft has not increased within the first predetermined time period following the transmission of the PTO control command:
transmit a speed control command associated with increasing a requested engine speed for the work vehicle;
determine an adaptive torque command for controlling the engagement of the PTO clutch as a function of the average engine-pre-load; and
control the engagement of the PTO clutch based on the adaptive torque command.

14. The system of claim 13, wherein, when determining the adaptive torque command, the controller is configured to:
determine a current torque value for the PTO clutch;
determine an incremental torque value based at least in part on the average engine pre-load; and
determine the adaptive torque command as a sum of the current torque value and the incremental torque value.

15. The system of claim 14, wherein the controller is configured to determine the incremental torque value using incremental proportional-integral-derivative (PID) control logic, the incremental PID control logic using adaptive gains determined as a function of the average engine pre-load.

16. The system of claim 15, wherein the adaptive gains for the incremental PID control logic increase with reductions in the average engine pre-load and decrease with increases in the average engine pre-load.

17. The system of claim 15, wherein the adaptive gains for the incremental PID control logic are determined as a function of both the average engine pre-load and an engine speed for the work vehicle.

18. The system of claim 17, wherein the adaptive gains for the incremental PID control logic increase with both reductions in the average engine pre-load and increases in the engine speed and wherein the adaptive gains for the incremental PID control logic decrease with both increases in the average engine pre-load and reductions in the engine speed.

19. The system of claim 13, wherein the controller is configured to determine the average engine pre-load by averaging engine loads for the work vehicle across a second predetermined time period occurring immediately prior to the transmission of the PTO control command.

20. The system of claim 13, wherein the controller is configured to determine that the output speed for the PTO clutch output shaft has not increased within the first predetermined time period by determining that the output speed for the PTO clutch has remained at zero speed across a maximum fill time for the PTO clutch following the transmission of the PTO control command.

* * * * *